United States Patent
Goodwin, III

(10) Patent No.: US 6,557,760 B2
(45) Date of Patent: May 6, 2003

(54) SYSTEM AND METHOD OF MANAGING EXPIRED PRODUCTS

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/822,584

(22) Filed: Mar. 30, 2001

(65) Prior Publication Data

US 2002/0139838 A1 Oct. 3, 2002

(51) Int. Cl.⁷ .............................................. G06K 15/00
(52) U.S. Cl. ........................ 235/383; 235/376; 235/385
(58) Field of Search ................................ 235/383, 385, 235/376

(56) References Cited

U.S. PATENT DOCUMENTS

| | | | |
|---|---|---|---|
| 4,816,824 A | 3/1989 | Katz et al. | 340/825.34 |
| 5,151,684 A | 9/1992 | Johnsen | 340/572 |
| 5,239,167 A | 8/1993 | Kipp | 235/383 |
| 5,619,416 A * | 4/1997 | Kosarew | 235/375 |
| 5,751,257 A * | 5/1998 | Sutherland | 235/383 |
| 5,802,015 A * | 9/1998 | Rothschild et al. | 116/202 |
| 6,009,400 A * | 12/1999 | Blackman | 235/449 |
| 6,019,394 A | 2/2000 | Chenoweth et al. | 283/81 |
| 6,131,399 A * | 10/2000 | Hall | 221/150 R |
| 6,172,596 B1 * | 1/2001 | Cesar et al. | 340/10.41 |
| 6,337,836 B1 * | 1/2002 | Eidelson | 221/2 |

FOREIGN PATENT DOCUMENTS

WO WO 94/23381 * 10/1994

OTHER PUBLICATIONS

Evans et al. "A Low–cost two–way radio transceiver", Signals, Systems, and Electronics, Sep. 29–Oct. 2, 1998, pp. 301–303.*

* cited by examiner

Primary Examiner—Michael G. Lee
Assistant Examiner—Seung H. Lee
(74) Attorney, Agent, or Firm—Paul W. Martin; Priest & Goldstein, PLLC

(57) ABSTRACT

A system and method of managing expired products which uses an electronic price label system to convey expiration information. The system includes a product label affixed to the time-sensitive product, an electronic price label system including an electronic price label and a product label interrogator controlled by the electronic price label which obtains the expiration information from the product label, and a computer which identifies the electronic price label as being associated with the product, causes the electronic price label to activate the product label interrogator to interrogate the product label, and receives the expiration information from the electronic price label. The computer may additionally compare the expiration information to current date information and cause the electronic price label to display a message indicating that the product has expired if the current date information is after expiration information.

10 Claims, 5 Drawing Sheets

SYSTEM AND METHOD OF MANAGING EXPIRED PRODUCTS

BACKGROUND OF THE INVENTION

The present invention relates to electronic price label (EPL) systems, and more specifically to a system and method of managing expired products.

EPL systems typically include a plurality of EPLs for merchandise items in a transaction establishment. EPLs typically display the price of corresponding merchandise items on store shelves and are typically attached to a rail or shelf channel along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file.

RFID technology provides an alternative to bar code reader technology for distinguishing and recording items for purchase. Some of the uses of RFID technology are disclosed in U.S. Pat. No. 6,019,394 assigned to the assignee of the present invention. This patent is hereby incorporated by reference.

Store associates must perform routine tasks throughout the store and require information to support operation of the store. Inventory management is on routine task which can be labor intensive. Some items, such as perishable food items, carry expiration dates assigned by the manufacturer or packager of the items. Store associates must routinely track and remove expired items from shelves.

Therefore, it would be desirable to combine the communication capabilities of electronic price label systems with RFID technology in order to identify expired products.

SUMMARY OF THE INVENTION

In accordance with the teachings of the present invention, a system and method of managing expired products is provided.

The system includes a product label affixed to the time-sensitive product, an electronic price label system including an electronic price label and a product label interrogator controlled by the electronic price label which obtains the expiration information from the product label, and a computer which identifies the electronic price label as being associated with the product, causes the electronic price label to activate the product label interrogator to interrogate the product label, and receives the expiration information from the electronic price label. The computer may additionally compare the expiration information to current date information and cause the electronic price label to display a message indicating that the product has expired if the current date information is after expiration information.

It is accordingly an object of the present invention to provide a system and method of managing expired products.

It is another object of the present invention to use expiration date information stored in a product RFID label to identify expired products.

It is another object of the present invention to communicate expiration date information stored in a product RFID label through an electronic price label system.

It is another object of the present invention to communicate expiration date information stored in a product RFID label through an electronic price label system and display an "expired" sign on the electronic price label.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
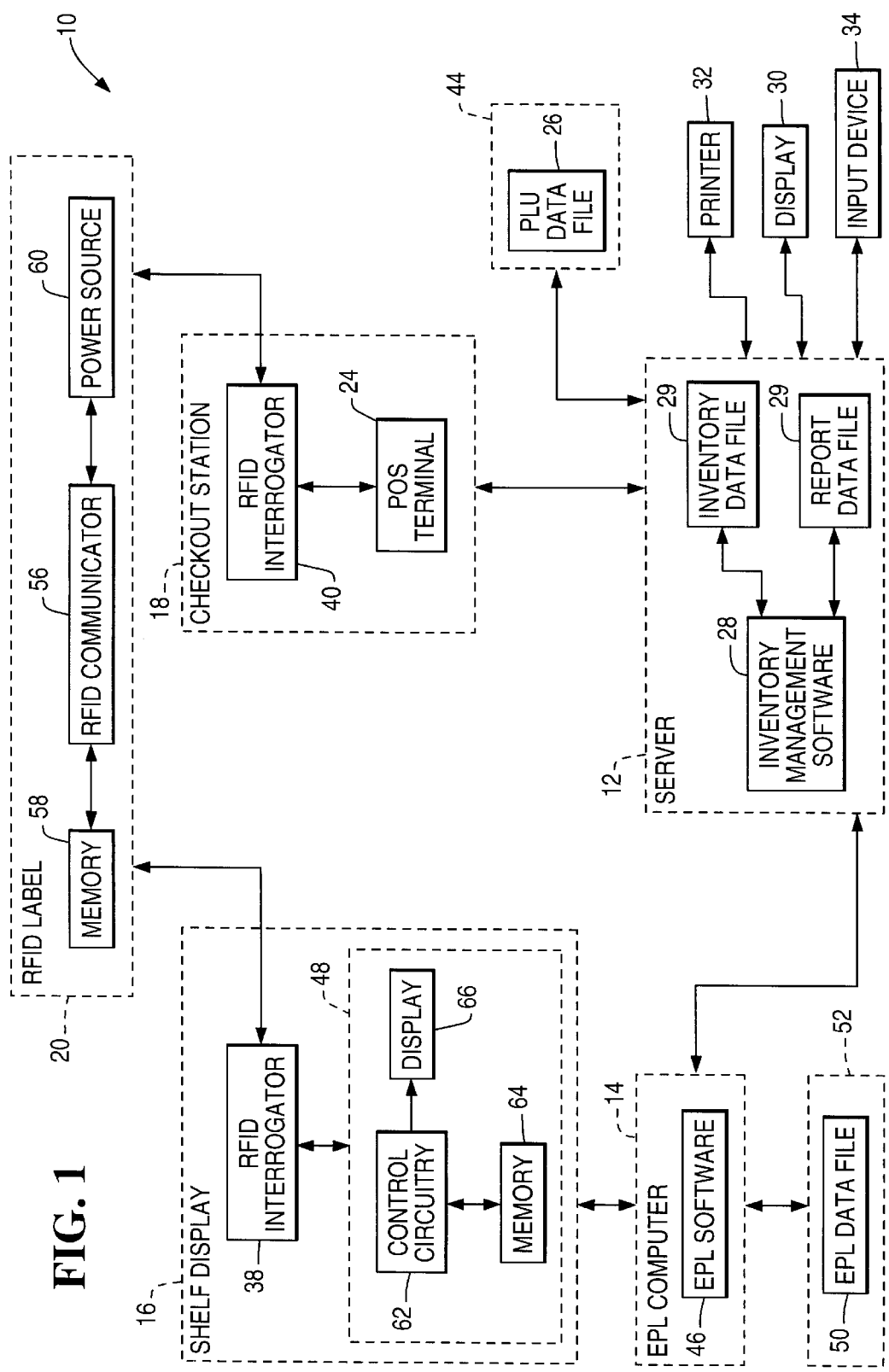
FIG. 1 is a block diagram of a transaction processing system.

Referring now to FIG. 1, transaction system 10 primarily includes server 12 and EPL computer 14, and radio frequency identification (RFID) label 20.

Server 12 handles price requests from POS terminal 24. POS terminal 24 sends item identification information to server 12 and server 12 returns the corresponding price from PLU data file 26. PLU data file is stored within storage medium 44.

Server 12 also executes inventory management software 28 which tracks inventory numbers on store shelves, tracks purchases at POS terminal 24, and tracks expired items. Inventory information is stored within inventory data file 29 and is reported to inventory management software 28 by RFID interrogators 36 and 40, which may include RF transceivers.

Inventory management software 28 maintains report data file 31, which contains a list of EPLs 48 associated with expired products and corresponding item identifications. Inventory management software 28 provides reports using report data file 31, which may be displayed by display 30 or printed by printer 32. A store employee may manage reporting and data entry through input device 34, which may include a keyboard.

To assist with execution of certain tasks performed by inventory management software, server 12 includes a built-in time keeping device, commonly referred to as a system clock, which is synchronized with current time, in order to automatically execute the tasks at their scheduled times.

The present invention also envisions that the functions of server 12 may be handled by EPL computer 14, or vise versa, effectively combining both of their functions into a single computer.

EPL computer 14 executes EPL software 46. EPL software 46 is responsible for scheduling and transmitting price data to EPLs 48. EPL software 46 obtains prices from PLU data file 26.

EPL software 46 periodically sends messages to EPLs 48 requesting current quantities of items associated with EPLs 48. EPL software 46 activates RFID interrogators 38 and forwards received shelf inventory information to inventory management software 28.

EPL software 46 also periodically sends messages to EPLs 48 associated with perishable items requesting expiration date information. EPL software 46 activates RFID interrogators 38. EPL software 46 forwards received expiration date information to inventory management software 28 for analysis. If the current date is after the expiration date reported by any of the items, inventory management software 28 changes inventory data file 29 to reflect that one or more items may have expired. A store employee may generate a report for viewing by display 30 or printing by printer 32.

Inventory management software 28 may also instruct EPL software 46 to send a message to the EPL 48 associated with the item with instructions to display an "expired" sign on display 66, which may include words, graphics, or a combination of both.

Communication between EPL computer 14 and EPLs 48 may be wireless or wired communication. EPLs 48 includes control circuitry 62 and memory 64.

EPL software 46 maintains EPL data file 50 which includes EPL identification information and price verification information. EPL data file 50 also identifies items which have perishable date information. EPL data file 50 is stored within storage medium 52.

EPL shelf display 16 includes RFID interrogator 38 and EPL 48. RFID interrogator 38 receives identification information from nearby items bearing RFID labels 20. RFID interrogator 38 obtains expiration date information from items having identification information associated with EPL 48 and communicates the expiration date information to EPL software 46 through EPL 48. RFID interrogator 38 may be mounted to shelves or integrated into shelves.

EPL 48 includes control circuitry 62, memory 64, and display 66. Control circuitry 62 controls operation of EPL 48. Control circuitry 62 receives incoming messages from EPL computer 14 and acknowledges messages from EPL computer 14. Control circuitry 62 receives expiration date information from RFID interrogators 38 and stores the expiration date information in memory 64 until it can be sent to EPL computer 14. Control circuitry 62 also displays an "expired" sign on display 66 in response to a message from EPL software 46.

Checkout station 18 includes POS terminal 24 and RFID interrogator 40. During checkout, RFID interrogator 40 obtains item identification information from items labeled with RFID labels 20 and reports the item identification information to POS terminal 24. POS terminal 24 sends the item identification information to server 12 with price requests. After receiving price information for the items from server 12, POS terminal 24 completes a sale of the items by accepting payment. POS terminal 24 also sends inventory adjustment information to server 12.

RFID label 20 includes RFID communicator 56, memory 58, and power source 60. Label communicator 56 sends item identification and expiration date information stored in RFID memory 58 to RFID interrogators 36. Label communicator 56 may include an RF transceiver.

Memory 58 stores item identification information and may include a read-only memory (ROM) for one-time use, or a programmable ROM (EPROM) for repeated use. Memory 58 also stores identification information for distinguishing RFID labels 20 from each other.

Power source 60 may include a battery.

RFID labels 20 may vary in size, depending upon product size, and may be visible or hidden when attached to products. RFID label 20 may be removably or permanently attached to products.

Figure 2:
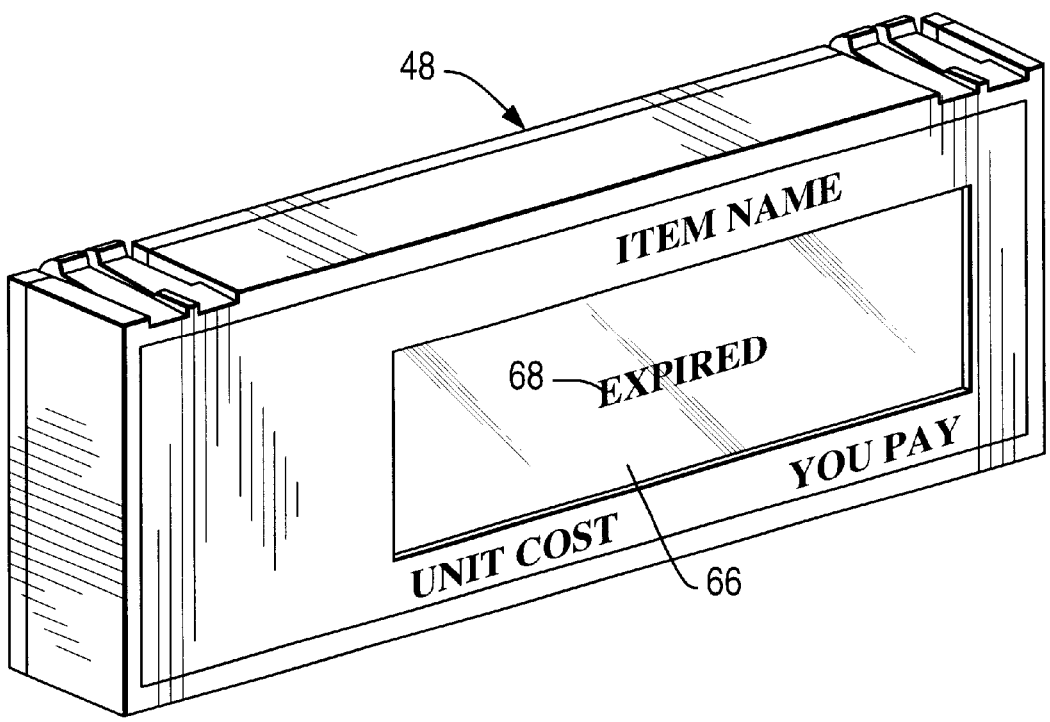
FIG. 2 shows an electronic price label displaying an example message.

Turning now to FIG. 2, EPL 48 is shown with an example expired sign 68. This example includes the word "EXPIRED".

Figure 3:
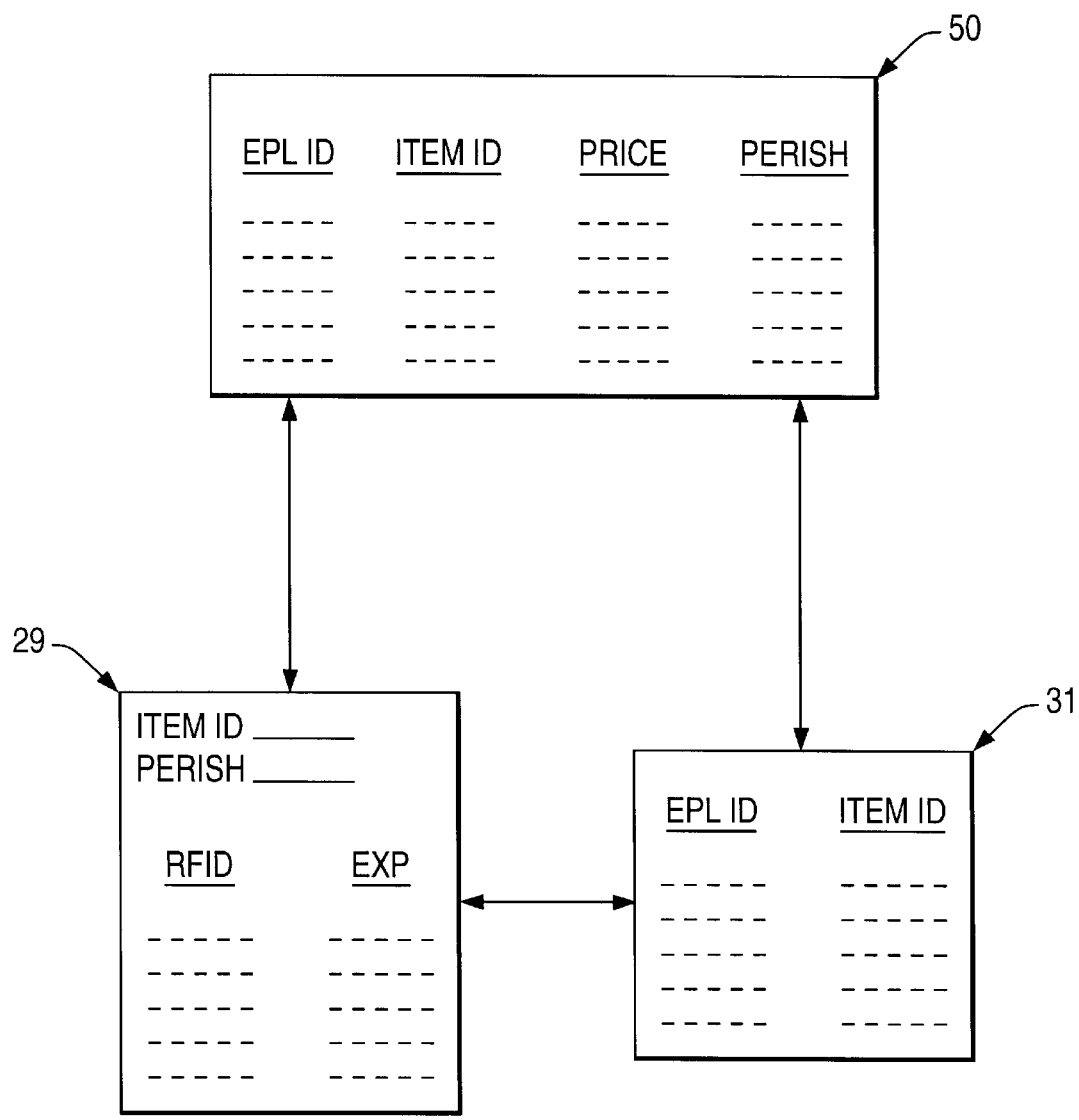
FIG. 3 shows an electronic price label data file and an inventory data file.

Turning now to FIG. 3, EPL data file 50 and inventory data file are shown in more detail.

EPL data file 50 includes entries EPL ID, ITEM ID, PRICE, and PERISH.

Entry EPL ID represents information identifying EPLs 48. Each EPL 48 has a unique identification.

Entry ITEM ID represents information identifying an item which is associated with a particular EPL 48 and is located adjacent EPL 48.

Entry PRICE represents price information for the item associated with EPL 48. Price information is derived from PLU data file 26 and may include price verification information.

Entry PERISH represents a date flag which is set to either on or off. If the flag is on, then the item associated with EPL 48 is a perishable item with an expiration date. Otherwise, the item is not a perishable item.

Inventory data file 29 includes records for each item in the store. Each record is identified by entries ITEM ID. Each record also includes entry PERISH associated with entry ITEM ID. Additional entries include RFID and EXP.

Entry RFID represents information identifying each RFID label 20 found in the store.

Entry EXP represents expiration date information for each RFID label 20.

RFID labels 20 are interrogated to determine their identities to determine inventory levels. RFID labels 20 associated with perishable items are interrogated to determine their expiration dates.

Report data file 31 contains a list of EPLs 48 associated with expired products and corresponding item identifications. Report data file 31 includes entries EPL ID and ITEM ID.

Entry EPL ID represents information identifying EPLs 48. Each EPL 48 has a unique identification.

Entry ITEM ID represents information identifying an item which is associated with a particular EPL 48 and is located adjacent EPL 48.

Figure 4A:
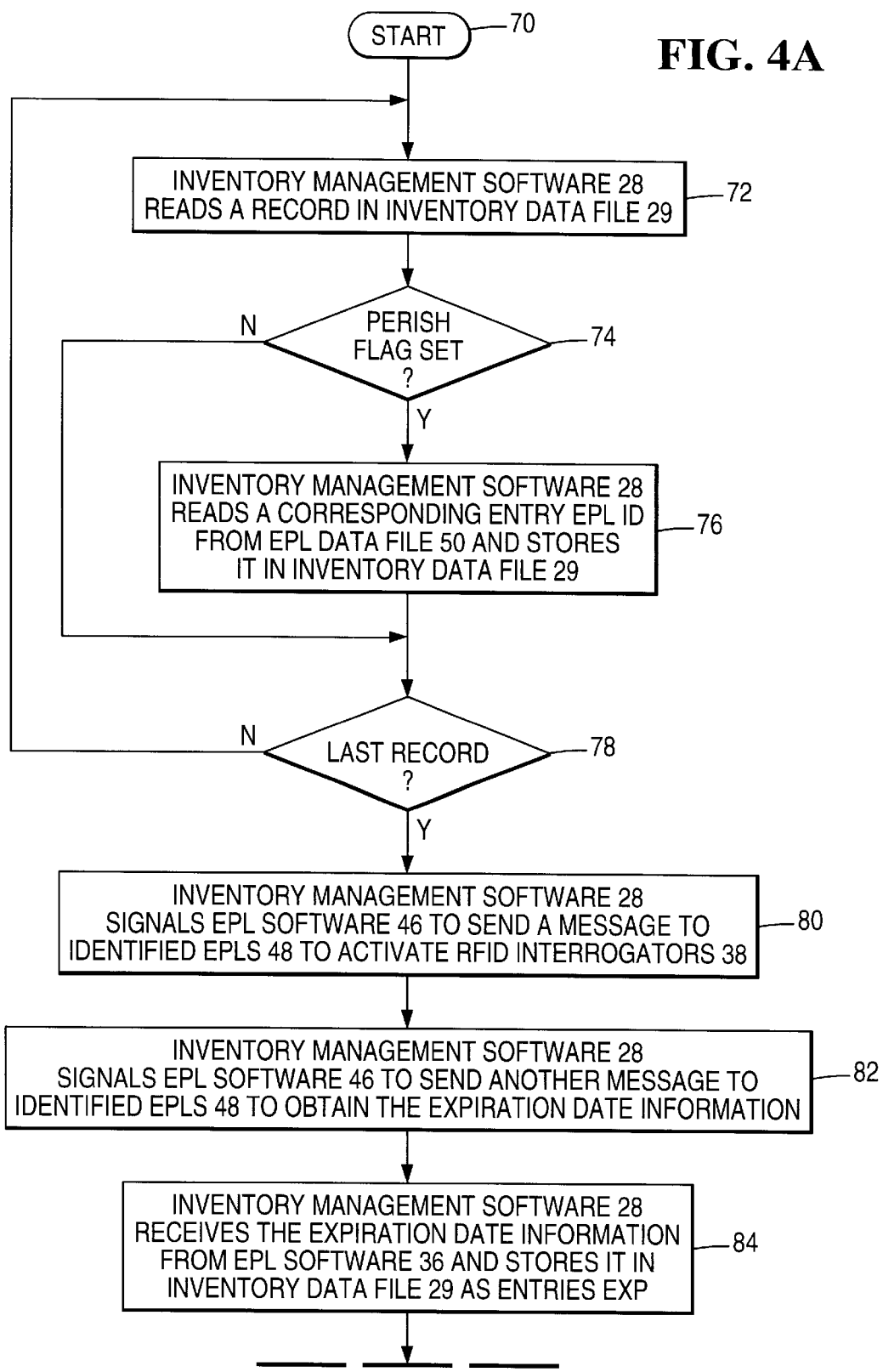
FIGS. 4A and 4B form a flow diagram illustrating the method of the present invention.
Figure 4B:
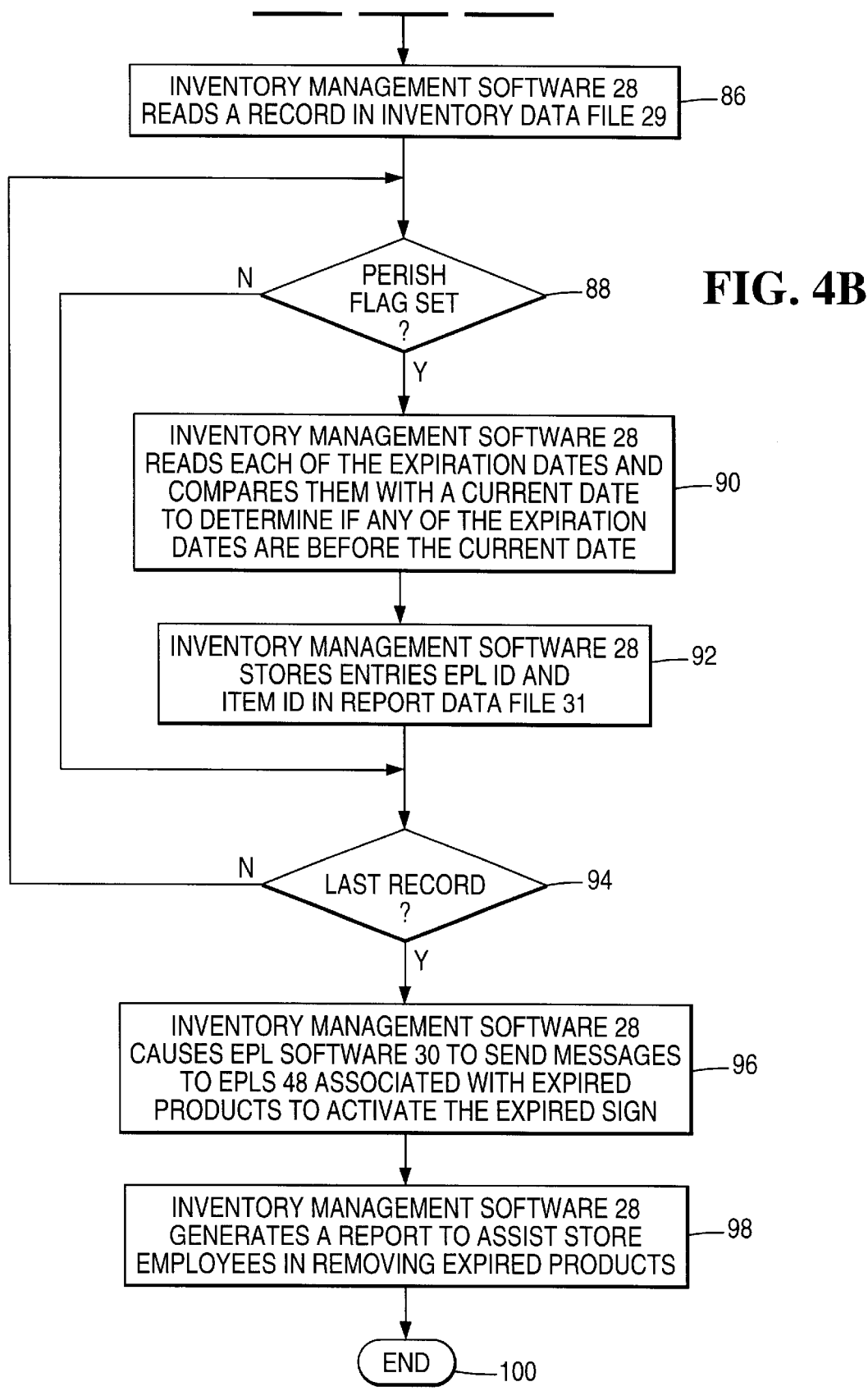

Turning now to FIG. 4, the method is illustrated in more detail beginning with START 70.

In step 72, inventory management software 28 reads a record in inventory data file 29.

In step 74, inventory management software 28 determines whether the PERISH flag is set for the ITEM ID. If so, operation proceeds to step 76. Otherwise, operation returns to step 78.

In step 76, inventory management software 28 reads a corresponding entry EPL ID from EPL data file 50 and stores it in inventory data file 29.

In step 78, inventory management software 28 determines whether the record is the last record. If not, operation returns to step 72 to read another record. If so, operation proceeds to step 80.

In step 80, inventory management software 28 signals EPL software 46 to send a message to identified EPLs 48 to activate RFID interrogators 38. The message is preferably a broadcast message addressed to all EPLs 48, but may also be addressed to individual EPLs 48 or groups of EPLs 48.

In response to the message, EPLs 48 activate RFID interrogators 38. RFID interrogators 38 receive messages from RFID labels 20 of perishable items.

In step 82, inventory management software 28 signals EPL software 46 to send another message to the identified EPLs 48 to obtain the expiration date information after a few minutes of time for collecting the expiration date information has passed.

In response to the message, EPLs 48 respond with the expiration date information.

In step 84, inventory management software 28 receives the expiration date information from EPL software 36 and stores it in inventory data file 29 as entries EXP.

In step 86, inventory management software 28 reads a record in inventory data file 29.

In step 88, inventory management software 28 determines whether the PERISH flag is set for the ITEM ID. If so, operation proceeds to step 90. Otherwise, operation proceeds to step 94.

In step 90, inventory management software 28 reads each of the expiration dates and compares them with a current date to see if any of the expiration dates are before the current date.

In step 92, inventory management software 28 stores entries EPL ID and ITEM ID of expired items in report data file 31.

In step 94, inventory management software 28 determines whether the ITEM ID record is the last record. If not, operation returns to step 88 to read another record. Otherwise, operation proceeds to step 96.

In step 96, inventory management software 28 causes EPL software 30 to send messages to EPLs 48 associated with expired products. The messages include a command to activate expired sign 68.

In step 98, inventory management software 28 generates a report from report data file 31 to assist store employees in removing expired products. The report may be printed by printer 32 or displayed by display 30. Store employees view the expired sign on affected EPLs 48 and visually check expiration dates to determine the expired products.

Operation ends at step 100.

Operation of inventory management software 28 may be scheduled or conducted manually.

Although the present invention has been described with particular reference to certain preferred embodiments thereof, variations and modifications of the present invention can be effected within the spirit and scope of the following claims.

I claim:

1. A method of obtaining expiration information about a time-sensitive item comprising the steps of:
    identifying the time-sensitive item;
    identifying an electronic price label associated with the time-sensitive item;
    causing the electronic price label to activate a product label interrogator to obtain the expiration information from a product label affixed to the time-sensitive item; and
    receiving the expiration information from the electronic price label.

2. The method of claim 1 in which the product label interrogator comprises a radio frequency identification interrogator, and in which the product label comprises a radio frequency identification label.

3. A method of pricing a time-sensitive product comprising the steps of:
    identifying the time-sensitive product;
    identifying an electronic price label associated with the time-sensitive product;
    causing the electronic price label to activate a product label interrogator to obtain expiration information from a product label affixed to the time-sensitive product;
    receiving the expiration information from the electronic price label;
    comparing the expiration information with current date information; and
    if the current date information is after the expiration information, then causing the electronic price label to display a message indicating that the product has expired.

4. The method of claim 3 in which the product label interrogator comprises a radio frequency identification interrogator, and in which the product label comprises a radio frequency identification label.

5. A method of pricing a time-sensitive product comprising the steps of:
    identifying the time-sensitive product;
    identifying an electronic price label associated with a number of instances of the time-sensitive product;
    causing the electronic price label to activate a product label interrogator to obtain expiration dates from product labels affixed to the instances of the time-sensitive product;
    receiving the expiration dates from the electronic price label;
    comparing the expiration dates with current date information; and
    if the current date information is after any of the expiration dates of the instances of the product, then causing the electronic price label to display a message indicating that the product has expired.

6. The method of claim 5 in which the product label interrogator comprises a radio frequency identification interrogator, and in which the product label comprises a radio frequency identification label.

7. A system for obtaining expiration information about a time-sensitive product comprising:
    a product label affixed to the product;
    an electronic price label system including
        an electronic price label; and
        a product label interrogator controlled by the electronic price label which obtains the expiration information from the product label; and
    a computer which identifies the electronic price label as being associated with the product, causes the electronic price label to activate the product label interrogator to interrogate the product label, and receives the expiration information from the electronic price label.

8. The system of claim 7 in which the product label interrogator comprises a radio frequency identification interrogator, and in which the product label comprises a radio frequency identification label.

9. A system of pricing a time-sensitive product comprising:
    a product label affixed to the time-sensitive product;
    an electronic price label system including
        an electronic price label; and
        a product label interrogator controlled by the electronic price label which obtains the expiration information from the product label; and
    a computer which identifies the electronic price label as being associated with the product, causes the electronic price label to activate the product label interrogator to interrogate the product label, receives the expiration information from the electronic price label, compares the expiration information to current date information, and causes the electronic price label to display a message indicating that the product has expired if the current date information is after expiration information.

10. The system of claim 9 in which the product label interrogator comprises a radio frequency identification interrogator, and in which the product label comprises a radio frequency identification label.

* * * * *